(12) United States Patent
Ben-Ezra et al.

(10) Patent No.: US 8,547,441 B2
(45) Date of Patent: Oct. 1, 2013

(54) SYSTEM AND METHODS FOR DE-BLURRING MOTION BLURRED IMAGES

(75) Inventors: Moshe Ben-Ezra, Princeton, NJ (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/194,643

(22) Filed: Jul. 29, 2011

(65) Prior Publication Data
US 2011/0286681 A1 Nov. 24, 2011

Related U.S. Application Data

(60) Division of application No. 12/341,195, filed on Dec. 22, 2008, now Pat. No. 8,009,197, which is a division of application No. 10/980,559, filed on Nov. 3, 2004, now Pat. No. 7,619,656, which is a continuation of application No. PCT/US03/19446, filed on Jun. 18, 2003.

(60) Provisional application No. 60/390,336, filed on Jun. 21, 2002.

(51) Int. Cl.
*H04N 5/228* (2006.01)

(52) U.S. Cl.
USPC .................................. 348/208.4; 348/208.99

(58) Field of Classification Search
USPC .. 382/254–275; 345/441–443; 715/700–773
See application file for complete search history.

(56) References Cited

U.S. PATENT DOCUMENTS

| 3,400,266 | A | | 9/1968 | Yoder et al. |
| 4,854,669 | A | | 8/1989 | Birnbach et al. |
| 5,172,233 | A | | 12/1992 | Yoshihara et al. |
| 5,206,717 | A | | 4/1993 | Sakata et al. |
| 5,448,053 | A | | 9/1995 | Rhoads |
| 5,638,461 | A | | 6/1997 | Fridge |
| 5,696,848 | A | | 12/1997 | Patti et al. |
| 5,737,456 | A | | 4/1998 | Carrington et al. |
| 5,949,914 | A | | 9/1999 | Yuen |
| 5,974,272 | A | | 10/1999 | Kiesow et al. |
| 6,075,905 | A | | 6/2000 | Herman et al. |
| 6,154,574 | A | * | 11/2000 | Paik et al. ..................... 382/255 |
| 6,181,376 | B1 | | 1/2001 | Rashkovskiy et al. |
| 6,639,626 | B1 | | 10/2003 | Kubo et al. |

(Continued)

OTHER PUBLICATIONS

Co-pending U.S. Appl. No. 11/207,342 (Abandoned), filed Aug. 19, 2005.

(Continued)

*Primary Examiner* — Lin Ye
*Assistant Examiner* — Euel Cowan
(74) *Attorney, Agent, or Firm* — Baker Botts L.L.P.

(57) ABSTRACT

Systems and methods for providing a substantially de-blurred image of a scene from a motion blurred image of the scene are disclosed. An exemplary system includes a primary detector for sensing the motion blurred image and generating primary image information representing the blurred image, a secondary detector for sensing two or more secondary images of the scene and for generating secondary image information representing the two or more secondary images, and a processor for determining motion information from the secondary image information, estimating a point spread function for the motion blurred image from the motion information, and applying the estimated point spread function to the primary image information to generate information representing the substantially de-blurred image.

11 Claims, 12 Drawing Sheets

(56) References Cited

U.S. PATENT DOCUMENTS

| | | | |
|---|---|---|---|
| 6,734,903 B1 | 5/2004 | Takeda et al. | |
| 7,619,656 B2 | 11/2009 | Ben-Ezra et al. | |
| 8,009,197 B2 | 8/2011 | Ben-Ezra et al. | |
| 2003/0002746 A1 | 1/2003 | Kusaka | |
| 2003/0063797 A1* | 4/2003 | Mao | 382/162 |
| 2003/0063814 A1 | 4/2003 | Herley | |

OTHER PUBLICATIONS

U.S. Appl. No. 10/980,559, filed Oct. 2, 2009 Issue Fee payment.
U.S. Appl. No. 10/980,559, Aug. 7, 2009 Notice of Allowance.
U.S. Appl. No. 10/980,559, Apr. 22, 2009 Response to Non-Final Office Action.
U.S. Appl. No. 10/980,559, Dec. 22, 2008 Non-Final Office Action.
U.S. Appl. No. 11/207,342, May 15, 2009 Notice of Abandonment.
U.S. Appl. No. 11/207,342, Oct. 30, 2008 Non-Final Office Action.
U.S. Appl. No. 12/341,195, filed Jul. 28, 2011 Issue Fee payment.
U.S. Appl. No. 12/341,195, Apr. 29, 2011 Notice of Allowance.
Ota, Masashi Pub. No. 06-153059, Video Record Reproducing Device, May 31, 1994.

\* cited by examiner

Tripod Image

Deblurred image
f = 633mm, Exp. Time 1 Sec

Blurred image
f = 633mm, Exp. Time 1 Sec

SYSTEM AND METHODS FOR DE-BLURRING MOTION BLURRED IMAGES

CROSS-REFERENCE TO RELATED APPLICATIONS

This application is a divisional of Ser. No. 12/341,195, filed Dec. 22, 2008 now U.S. Pat. No. 8,009,197, which is a divisional of U.S. patent application Ser. No. 10/980,559 filed Nov. 3, 2004 (now U.S. Pat. No. 7,619,656) which is a continuation of International Patent Application No. PCT/US03/19446, filed Jun. 18, 2003, published on Dec. 31, 2003 as International Patent Publication No. WO 04/001667, which claims priority to U.S. Provisional Patent Application Ser. No. 60/390,336, filed Jun. 21, 2002, all of which are incorporated herein by reference for all purposes and from which priority is claimed.

NOTICE OF GOVERNMENT RIGHTS

The United States government has certain rights in the present invention pursuant to National Science Foundation ITR Award IIS-00-85864.

BACKGROUND OF THE INVENTION

1. Technical Field

The present invention relates to techniques for digitally capturing and processing still images of a scene using an image detector, and more particularly, to techniques for correcting blurring introduced into such images due to motion of the image detector.

2. Background Art

Motion blur due to camera shake is a common problem in photography, especially in conditions involving zoom and low light. Merely pressing a shutter release button on the camera can in and of itself cause the camera to shake, and unfortunately cause blurred images. This problem is especially prevalent in digital photography, where lightweight cameras with automated exposure times are not easily stabilized are common, and where automated exposure times often necessitate relatively long stabilization to ensure a non blurred image. The compact form and small lenses of many of these cameras only serves to increase this problem.

The sensor of a digital camera creates an image by integrating energy over a period of time. If during this time—the exposure time—the image moves, either due to camera or object motion, the resulting image will exhibit motion blur. The problem of motion blur is increased when a long focal length (zoom) is employed, since a small angular change of the camera creates a large displacement of the image, and in situations when long exposure is needed, either due to lighting conditions, or due to the use of small aperture.

There have been several attempts to provide a solution to this problem. One group of solutions focus on the reduction or elimination of relative movement between the camera and the scene during the integration time. Such solutions include the use of a tripod, flash photography, the use of increased sensor sensitivity, the use of an increased aperture, and dynamic image stabilization.

A stable tripod that can resist wind, and a shutter release cable that does not transmit hand vibration to a camera mounted on such a tripod, eliminates the problem of camera shake where both the mounted camera and scene are static. One limitation is that only professionals are likely to use a tripod and shutter release cable on a regular basis. Moreover, the use of a tripod does not solve the problem of shooting from a moving platform, such as car, train, helicopter or balloon.

A photographic flash produces a strong light flux that sustained for a fraction of a section (less than $\frac{1}{1000}$). The exposure time is set to bracket the flash time (usually $\frac{1}{60}$ sec), and the aperture of the camera is set to match the flash flux. Therefore, blur caused by motion during the bracket time has very low intensity. In essence, the flash "freezes" motion of both camera and moving objects. However, objects in bright daylight may still have motion blur and, of course, flash photography is useful only if the distance between the flash and the object is small.

Increasing the sensor sensitivity, and therefore reducing the exposure time, can decrease the problem of motion blur. However, it cannot eliminate blur completely. Moreover, Sensitive sensors (both film and CCD) produce noisy and grainy images.

Increasing the aperture size greatly decreases the required exposure time, and thus reduces motion blur. Unfortunately, cost and weight also significantly increase with an increased lens aperture, and a tripod may be required to comfortably handle such weight. Also, the use of a larger aperture lens is applicable only for more expensive cameras where it is possible to replace the lens.

In addition, the use of dynamic image stabilization involves the incorporation of inertial sensors, such as gyroscopes, to sense and compensate for camera shake in real time by moving an optical element. While this technology is used in stabilized zoom lens for Single Lens Reflex ("SLR") cameras, it is costly, and its effectiveness is limited to approximately $\frac{1}{60}$ of a second for typical 400 mm zoom lens. The sensitivity of such system to very slow motion may also be limited, and may suffer from drift. In addition, such system cannot compensate for constant speed motion, such as occurs when taking images from a moving train.

Accordingly, while addressing the problem of motion of the camera itself is useful in certain applications, it does not provide an adequate solution to the problem of motion blur as such systems are either limited, very costly, or both. An alternative approach is to correct blur after the image has been taken by using a de-blurring algorithm.

However, while approaches which either assume that the point spread function is known or can be modeled by a simple function and found automatically from the image itself no satisfactory solutions have thus far been provided. In particular, it has been difficult to obtain a useful point spread function useful in a de-blurring algorithm since inaccurate point spread functions tends to create strong artifacts, making them unpleasant for the eye. Accordingly, there remains a need for a technique for correcting blurring introduced into an image due to camera motion by finding an accurate point spread function.

SUMMARY OF TEE INVENTION

An object of the present invention is to provide a technique for correcting blurring introduced into an image due to camera motion.

A further object of the present invention is to provide a technique for correcting blurring introduced into an image due to camera motion by using associated motion information.

Another object of the present invention is to provide an apparatus able to capture all information required to correct blurring introduced into an image due to camera motion.

Still another object of the present invention is to provide an apparatus for capturing a motion blurred image, de-blurring the image, and providing a user with a de-blurred image.

In order to meet these and other objects of the present invention which will become apparent with reference to further disclosure set forth below, the present invention discloses a system for providing a substantially de-blurred image of a scene from a motion blurred image of the scene. The system includes a primary detector for sensing the motion blurred image at a first predetermined resolution and generating primary image information representing the blurred image, a secondary detector for sensing two or more secondary images of the scene and for generating secondary image information representing the two or more secondary images, and a processor. The processor is advantageously adapted to determine motion information from the secondary image information, estimate a point spread function for the motion blurred image from the motion information, and apply the estimated point spread function to the primary image information to generate information representing the substantially de-blurred image.

In one arrangement, the system includes a first camera housing the primary detector, a second camera housing the secondary detector, and a rigid member connecting the cameras. Alternatively, a single camera may house both the primary and secondary detectors.

In another preferred arrangement, a beam splitter having one input area and first and second output areas is provided. The beam splitter is optically coupled to the scene at the input area, to the primary detector at the first output area, and to the secondary detector at the second output area. Advantageously, the beam splitter may be an asymmetric beam splitter adapted to output greater than 50% of an input image energy through the first output area, and preferably approximately 90% of an input image energy through the first output area.

In still another preferred arrangement, the primary detector is a first portion of a dual-resolution sensor and the secondary detector a second portion of the dual-resolution sensor. The ratio of the first predetermined resolution to said second predetermined resolution is preferably 9:1 in terms of the scene energy incident on the sensor. The two portions may advantageously be formed on a single chip, to ensure a low cost and compact system.

The present invention also provides methods for providing a substantially de-blurred image of a scene from a motion blurred image of said scene. In one method, the motion blurred image of the scene and two or more secondary images are sensed. Next, primary image information representing the blurred image and secondary image information representing the two or more secondary images are generated, and motion information from the secondary image information is determined. A point spread function for said motion blurred image from said motion information; and the estimated point spread function is applied to the primary image information to generate information representing the substantially de-blurred image Advantageously, fifteen or more secondary images of the scene should be sensed at the second predetermined resolution. It is preferred that global motion information is determined from the secondary image information, and a continuos point spread function estimated from the global motion information.

The accompanying drawings, which are incorporated and constitute part of this disclosure, illustrate preferred embodiments of the invention and serve to explain the principles of the invention.

Figure 1B:
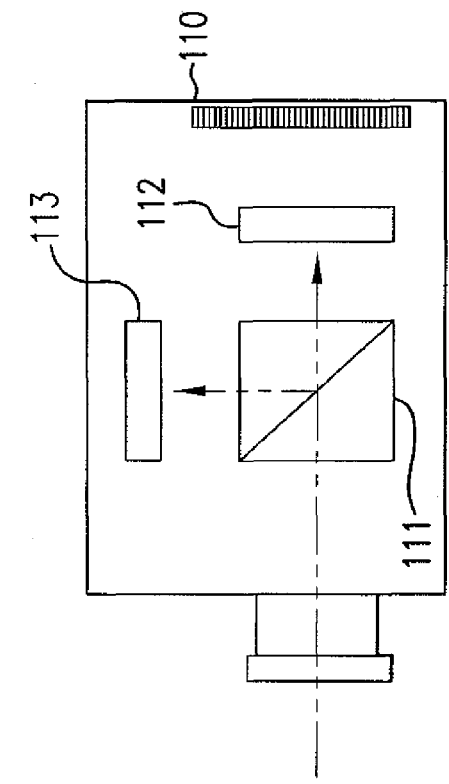
FIGS. 1(a)-(c) are block diagrams of exemplary systems in accordance with the present invention.

Throughout the Figs., the same reference numerals and characters, unless otherwise stated, are used to denote like features, elements, components or portions of the illustrated embodiments. Moreover, while the present invention will now be described in detail with reference to the Figs., it is done so in connection with the illustrative embodiments.

DETAILED DESCRIPTION OF THE PREFERRED EMBODIMENTS

Figure 1C:
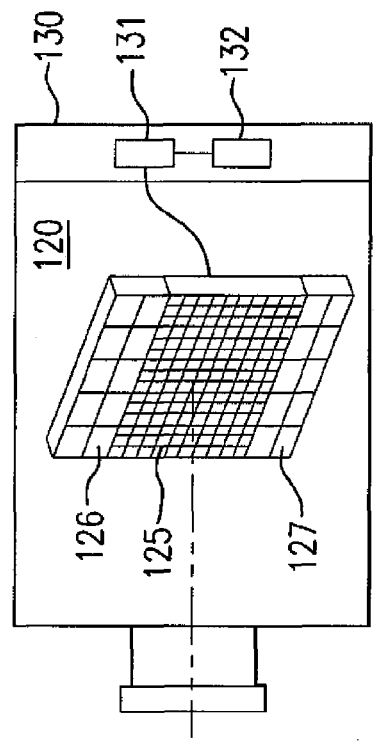
Figure 1A:
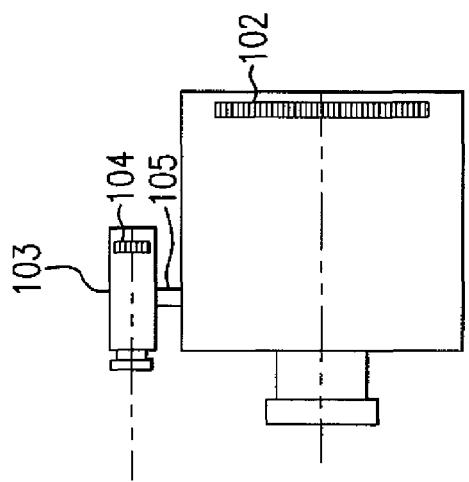

Referring to FIGS. 1(a)-(c), exemplary hybrid camera systems in accordance with the present invention are shown. Each system includes a primary image detector for capturing an image of the scene, as well as a secondary detectors for capturing information useful for correcting blurring introduced into the image due to camera motion.

The embodiment shown in FIG. 1(a) uses two cameras 101, 103 connected by a rigid member 105. Camera 101 is preferably a high-resolution still camera, and includes the primary detector 102 to capture an image of a scene. Camera 103 is preferably a low-resolution video camera which includes a secondary detector 104.

The secondary detector 104 is used for obtaining motion information, and therefore must capture a minimum of two frames of digital video information in order to provide such motion information. Preferably, fifteen or more frames axe captured during the integration time of camera 101. While the embodiment shown with reference to FIG. 1(a) depicts a camera mounted on a camera, other two camera arrangements, such as a camera within a camera, may be utilized to achieve the same results.

The detector 102 may be traditional film, a CCD sensor, or CMOS sensor. Secondary detector 104 may likewise be a CCD or CMOS sensor. It is advantageous for the secondary detector 104 to be a black and white sensor, since such a detector collects more light energy (broader spectrum) and therefore can have higher temporal resolution. In addition, since the secondary detector is used only as a motion sensor;

it can be of low spatial resolution to increase the temporal resolution and have high gain.

An alternative embodiment, shown in FIG. 1(b), employs a single camera 110 and a beam splitter 111 to generate two image paths leading to primary 112 and secondary 113 detectors. This system requires less calibration than the system of FIG. 1(a) since the same camera lens is shared, and hence results in identical image projection models.

Those skilled in the art will recognize that a tradeoff exists between the spatial resolution of the primary detector 112 and the ability to accurately provide motion information by the secondary detector 113 as the beam splitter 111 divides the available energy between the two detectors 112, 113. Therefore, while a beam splitter which divides the energy 50/50 between the two detectors may be utilized, it is preferred that the division be greater than 80/20, for example, an approximately 90/10 split, with more energy going to the primary 112 detector.

In a highly preferred arrangement, the beam splitter 111 is an asymmetric beam splitter that passes most of the visible light to the primary detector 112 and reflects non-visible wavelengths toward the secondary detector 111. For example a "hot mirror" beam splitter which is commercially available from Edmund Industrial Optics may be employed.

Another alternative embodiment, shown in FIG. 1(c), uses a special chip 121 that includes both primary and secondary detectors. The chip 121 includes both a high-resolution central area 125, which functions as the primary detector, and a low resolution peripheral areas 126, 127, which function as the secondary detector.

The chip 121 may be implemented using binning technology now commonly found in CMOS and CCD sensors. Binning allows the charge of a group of adjacent pixels to be combined before digitization. This enables the chip to switch between a normal full-resolution mode, when binning is not used, and a hybrid primary-secondary detector mode, when binning is activated. In the hybrid mode, the primary detector portion 125 captures a high resolution image, while the secondary detector portions 126, 127 capture a sequence of low resolution images from which motion information can be derived.

Given sufficient light, CCD and CMOS sensors can detect a scene at very fast rates and thereby avoid camera blur. However, motion blur will occur when there is not sufficient light for fast imaging, since the amount of energy reaching each pixel is $$\int \frac{\Psi_{fov} \cdot k}{n} dt,$$

where: $\phi_{fov}$ is the flux though the field of view, k is the fill factor, n is the number of pixels, and the integral is taken over exposure time. Reducing the number of pixels while keeping the same field of view equates into lowering resolution, and thereby increasing the energy per pixel.

Lower resolutions may be achieved either by using a low-resolution chip, or through binning, as discussed above. Examples for the image dimension of the hi-resolution and low-resolution sensors for example ratios of $$\frac{1}{36} \text{ and } \frac{1}{64}$$

pixels at common resolutions are given in Table 1.

TABLE 1

| | Hi res | | | | |
|---|---|---|---|---|---|
| | 1024 × 768 | 1280 × 960 | 1600 × 1200 | 2048 × 1536 | 2560 × 1920 |
| 1/36 ratio | 170 × 128 | 213 × 160 | 266 × 200 | 341 × 256 | 426 × 320 |
| 1/64 ratio | 128 × 96 | 160 × 120 | 200 × 150 | 256 × 192 | 320 × 240 |

Also as shown in FIG. 1(c), the camera 120 preferably includes a circuit card or area which includes memory 121 for storing both the primary and secondary images sensed by detector portions 125-127. The camera also preferably includes processor 122 for computing motion from the sequence of low resolution images, estimating a point spread function for the primary image from such motion information, and de-blurring the primary image with the estimated point spread function by applying a deconvolution algorithm, each of which are described below. The processor and memory should be sufficiently small to be implemented within the camera. Exemplary software that may be stored in memory 121 and executed on processor 122 is included herein as Appendix A. The de-blurred image may then be displayed to the operator of camera 120 threw a standard display (not shown), or stored for later use.

Alternatively, the motion computation, point spread function estimation, and de-blurring functions may be performed by a separate computer, such as personal computer running the software of Appendix A. In addition, while the foregoing description has been with respect to the embodiment shown in FIG. 1(c), it equally applies to the embodiments shown in FIGS. 1(a) and (b), as each may be readily modified to include suitable memory and processing capacity. Likewise, the software of Appendix A is exemplary, and alternative software arrangements in a variety of programming languages may be utilized for performing such functionality.

Figure 2:
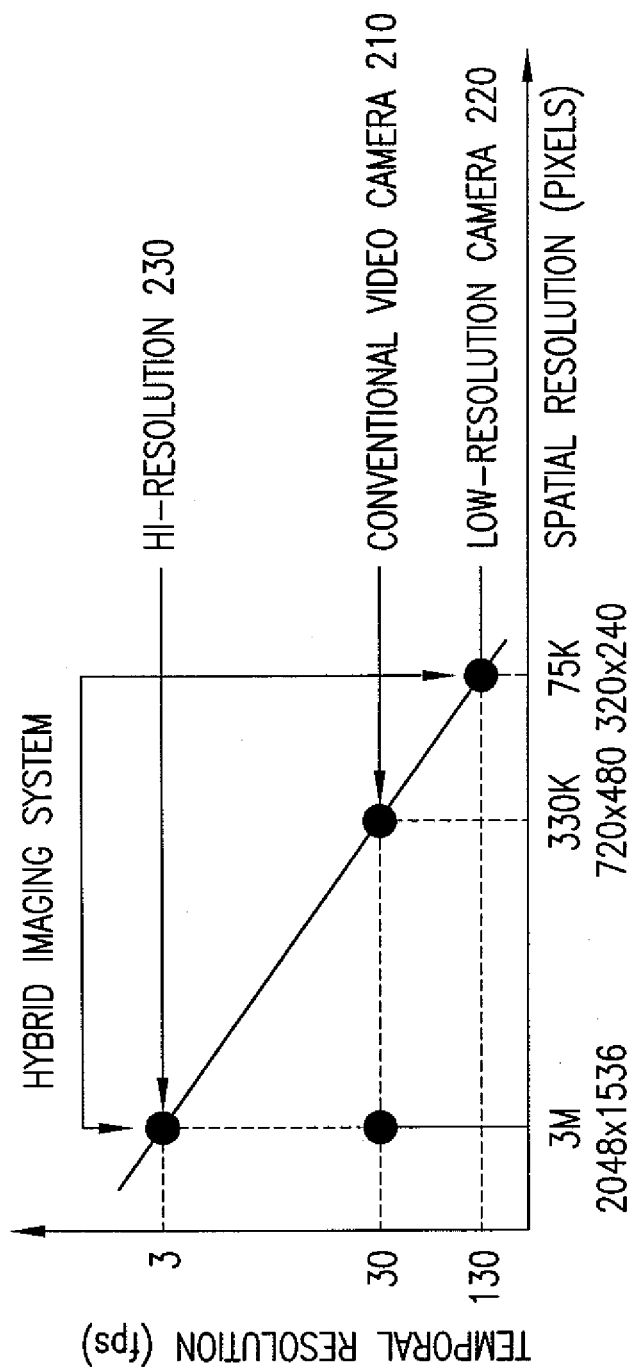
FIG. 2 is a graph showing the relationship between temporal resolution and spatial resolution.

Referring next to FIG. 2, a graph illustrating the fundamental tradeoff between spatial resolution and temporal resolution in an imaging system is shown. An image is formed when light energy is integrated by an image detector over a time interval. Assuming that the total light energy received by a pixel during integration must be above a minimum level for the light to be detected, the minimum is determined by the signal-to-noise characteristics of the detector. Therefore, given such a minimum level and an incident flux level, the exposure time required to ensure detection of the incident light is inversely proportional to the area of the pixel. In other words, exposure time is proportional to spatial resolution. When the detector is linear in its response, the above relationship between exposure and resolution is also linear.

The parameters of the line shown in FIG. 2 are determined by the characteristics of the materials used by the detector and the incident flux. Different points on the line represent cameras with different spatio-temporal characteristics. For instance, a conventional video camera 210 has a typical temporal resolution 30 fps and a spatial resolution of 720×480 pixels. Instead of relying on a single point, two very different operating points on the line may be used to simultaneously obtain very high spatial resolution with low temporal resolution 220 and very high temporal resolution with low spatial resolution 230. This type of hybrid imaging provides the missing information needed to de-blur images with minimal additional resources.

Figure 3:
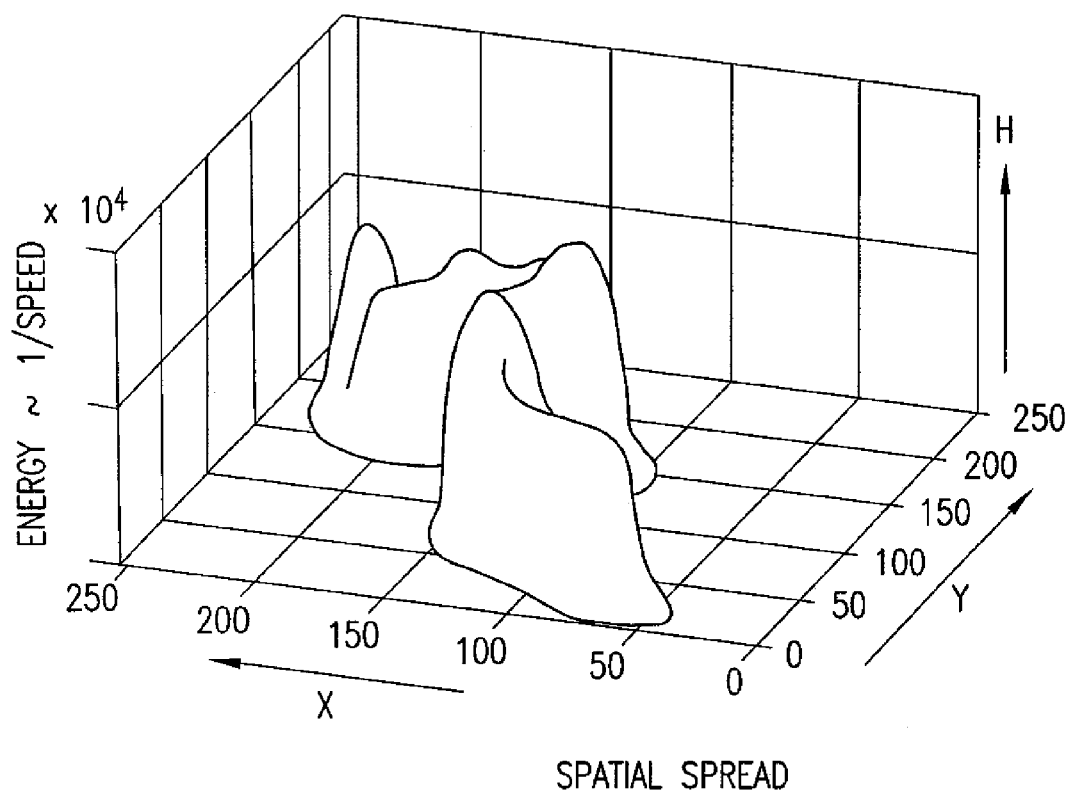
FIG. 3 is a graph showing an illustrative point spread function.

Referring next to FIG. 3., an exemplary point spread function is shown. The complete point spread function of a motion-blurred image consists of two parts. First and most importantly, there is a point spread function due to motion. The derivation of such a point spread function is addressed in detail below. However, it should be noted that there may be a second component to a complete point spread function, that of the imaging system itself, and may either be measured or modeled using a-priori knowledge of the imaging system. Those skilled in the art will appreciate that various techniques exist to conduct such measurement or modeling.

In order to determine the point spread function due to motion, a secondary detector provides a sequence of images (frames) that are taken at fixed intervals during the exposure time. By computing the global motion between these frames, samples of the continuous motion path during the integration time may be obtained. The motion between successive frames is limited to a global rigid transformation model. However, the path, which is the concatenation of the motions between successive frames, is not restricted and can be very complex. Accordingly, the motion between successive frames may be determined using a multi-resolution iterative algorithm that minimizes the following optical flow based error function:

$$\operatorname*{argmin}_{u,v} \sum \left(u\frac{\partial I}{\partial x} + v\frac{\partial I}{\partial y} + \frac{\partial I}{\partial t}\right)^2 \quad (1)$$

where the partial derivatives are the spatial and temporal partial derivatives of the image, and (u, v) is the instantaneous motion at time t. This motion between the two frames is defined by the following global rigid motion model:

$$\begin{bmatrix} u \\ v \end{bmatrix} = \begin{bmatrix} \cos\theta & \sin\theta & tx \\ -\sin\theta & \cos\theta & ty \end{bmatrix} \begin{bmatrix} x \\ y \\ 1 \end{bmatrix} \quad (2)$$

where $(t_x, t_y)$ is the translation vector and θ is the rotation angle about the optical axis.

Note that the secondary detector, which has a short but nonzero integration time, may also experience some motion blur. This motion blur can violate the constant brightness assumption, which is used in the motion computation. However, under certain symmetry conditions, the computed motion between two motion blurred frames is the center of gravity of the instantaneous displacements between these frames during their integration time.

The discrete motion samples that are obtained by the motion computation need to be converted into a continuous point spread function. For this purpose, the constraints that a motion blur point spread function must satisfy are defined and then used in order to estimate the appropriate point spread function.

Any point spread function is an energy distribution function, which can be represented by a convolution kernel k:(x, y)=>w, where (x, y) is a location and w is the energy level at that location. The kernel k must satisfy the following energy conservation constraint:

$$\iint k(x,y)dxdy = 1 \quad (3)$$

which states that energy is neither lost nor gained by the blurring operation (k is a normalized kernel). In order to define additional constraints that apply to motion blur point spread functions, a time parameterization of the point spread function is used as a path function f:t=>(x, y) and an energy function h:t>w. Due to physical speed and acceleration constraints, f(t) should be continuous and at least twice differentiable, where f'(t) is the speed and f"(t) is the acceleration at time t.

By assuming that the scene radiance does not change during image integration, an additional constraint is determined:

$$\int_{t}^{t+\delta t} h(t)dt = \frac{\delta t}{t_{end} - t_{start}}, \delta t > 0, t_{start} \leq t \leq t_{end} - \delta t, \quad (4)$$

where $[t_{\_START}, t_{\_END}]$ is the image integration interval. This constraint states that the amount of energy which is integrated at any time interval is proportional to the length of the interval.

Given these constraints and the motion centroid assumption, a continuous motion blur point spread function may be estimated from discrete motion samples, as illustrated in FIGS. 4(a)-(d).

Figure 4B:
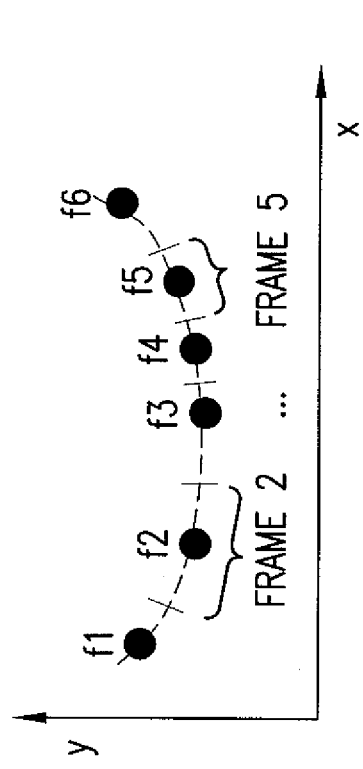
FIGS. 4(a)-(d) are graphs illustrating the computation of a continuos point spread function from discrete motion vectors in accordance with an embodiment of the present invention.
Figure 4A:
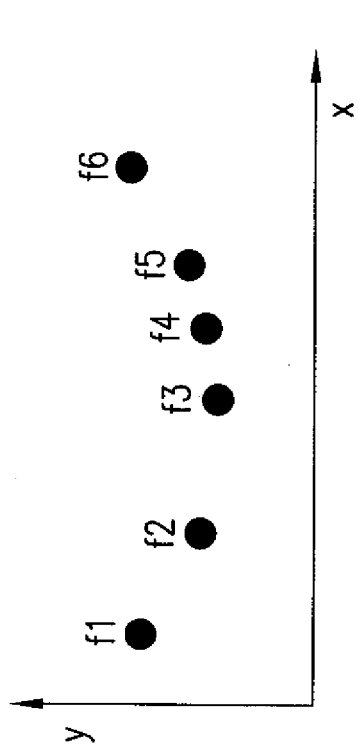

First, the path f(t) may be estimated by Spline interpolation, as shown in FIGS. 4(a) and (b). Spline curves are preferably used because of their smoothness and twice differentiability properties, which satisfy the speed and acceleration constraints.

In order to estimate the energy function h(t), the extent of each frame along the interpolated path must be determined. This may be accomplished using the motion centroid assumption by splitting the path f(t) into frames with a Voronoi Tessellation, as shown in FIG. 4(b).

Figure 4D:
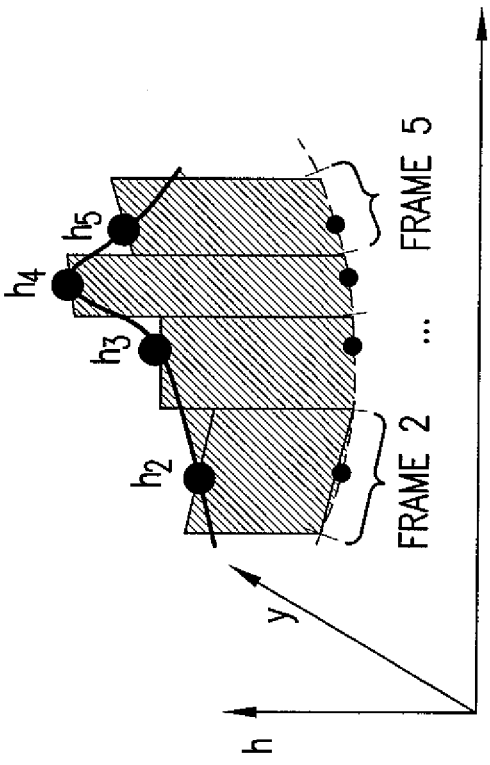
Figure 4C:
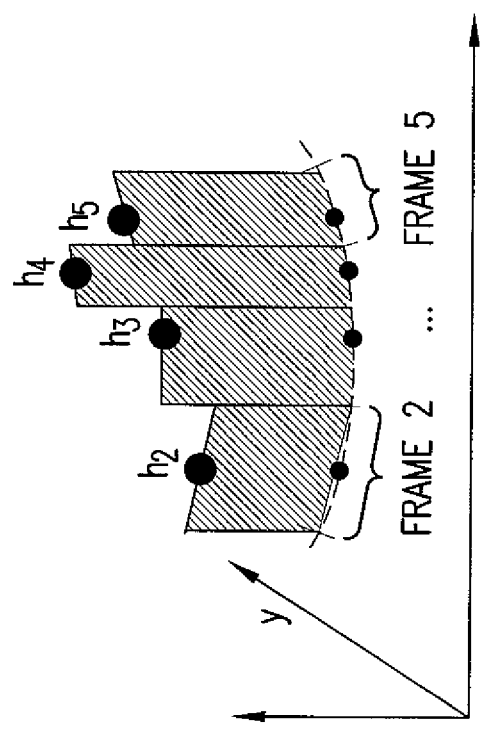

Since the constant radiance assumption implies that frames with equal exposure times integrate equal amount of energy, h(t) may be computed, up to scale, for each frame as shown in FIG. 4(c). Note that all the rectangles in this figure have equal areas.

Finally, h(t) is normalized in order to satisfy the energy conservation constraint and smooth it. The resulting point spread function is shown in FIG. 4(d). The end result of the above procedure is a continuous motion blur point spread function that can now be used for motion de-blurring.

Given the estimated point spread function, the high-resolution image that was captured by the primary detector may be de-blurred using well known image deconvolution algorithms, such as the Richardson Lucy algorithm. Since this is the only step that involves high-resolution images, it dominates the time complexity of the method, which is usually the complexity of a Fast Fourier Transform ("FFT").

Figure 5A:
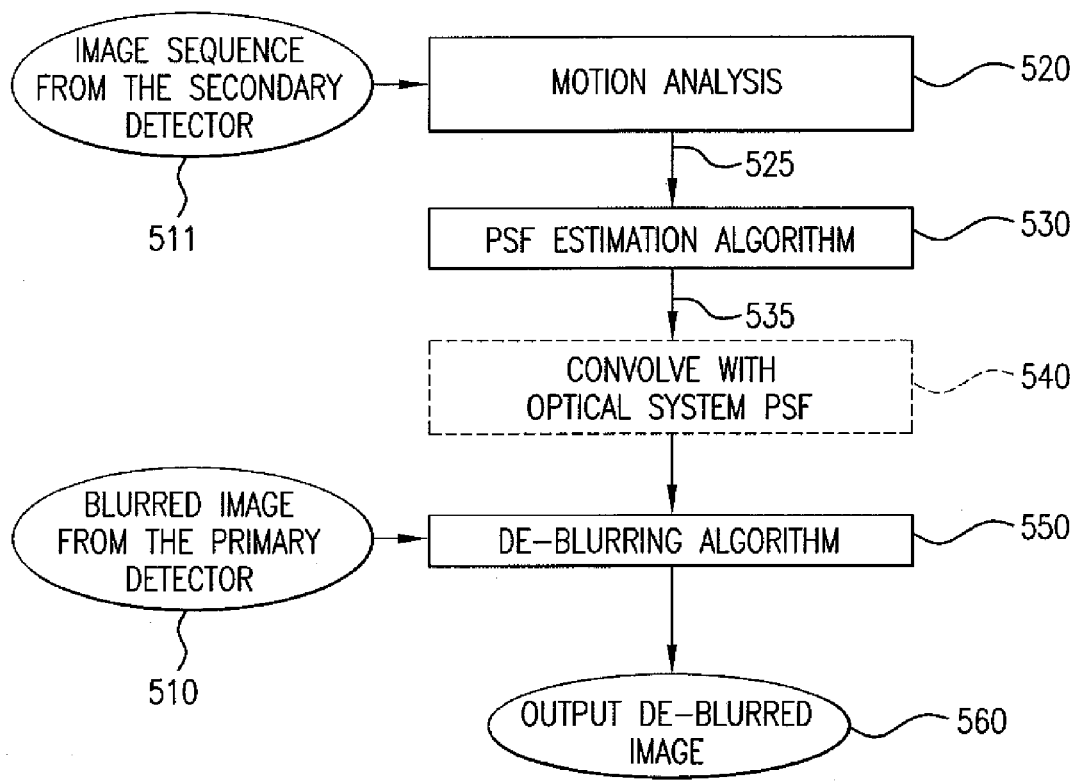
FIGS. 5(a) and (b) are flow diagrams of a method for de-blurring a motion blurred image including deriving a point spread function in accordance with the present invention.

Referring next to FIG. 5(a), the foregoing techniques are implemented in a methodology as follows. First, primary image information representing the blurred image sensed by the primary detector 510, and secondary image information representing a sequence of images sensed by the secondary detector 511, are obtained. A standard motion analysis algorithm is used to determine discrete motion information 520 of the primary detector. Next, the point spread function for the motion blurred image is estimated 530 using the discrete motion information. That point spread function 535 may optionally be convolved with an estimated or measured point spread function for the optical system itself 540. The point spread function is then applied to the primary image information in a standard de-blurring algorithm, 550, and a de-blurred image is output 560.

Figure 5B:
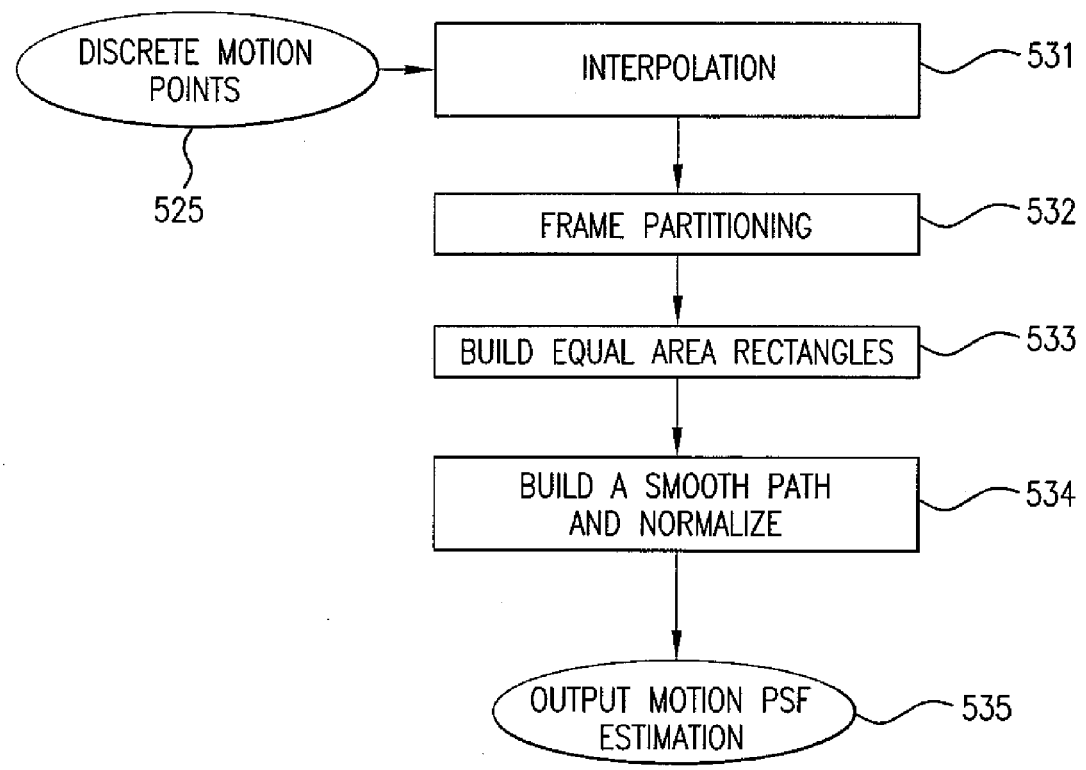
Figure 6A:
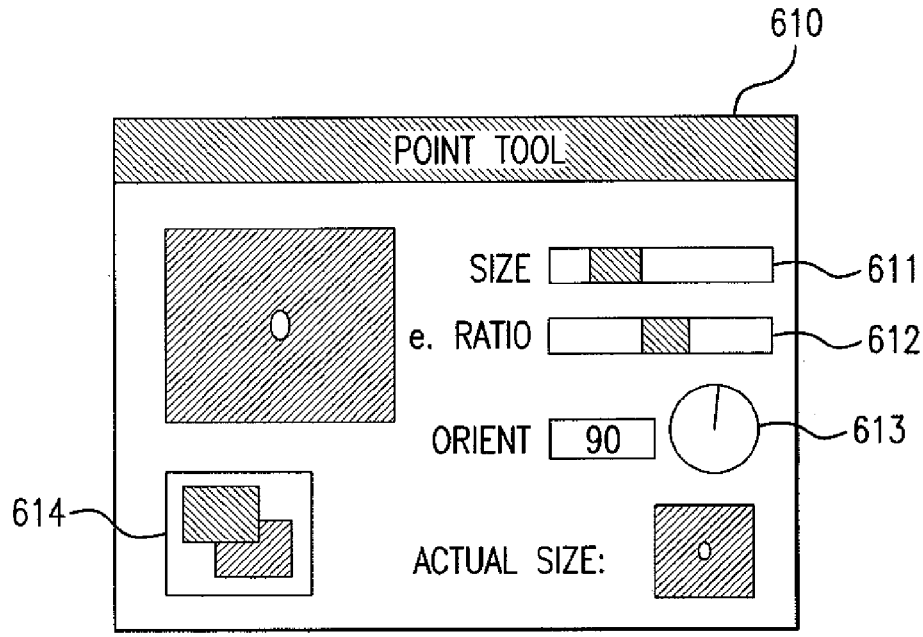
FIGS. 6(a)-(d) are illustrative diagrams showing exemplary tools that may be used to model a point spread function in accordance with an alternative embodiment of the present invention.
Figure 6B:
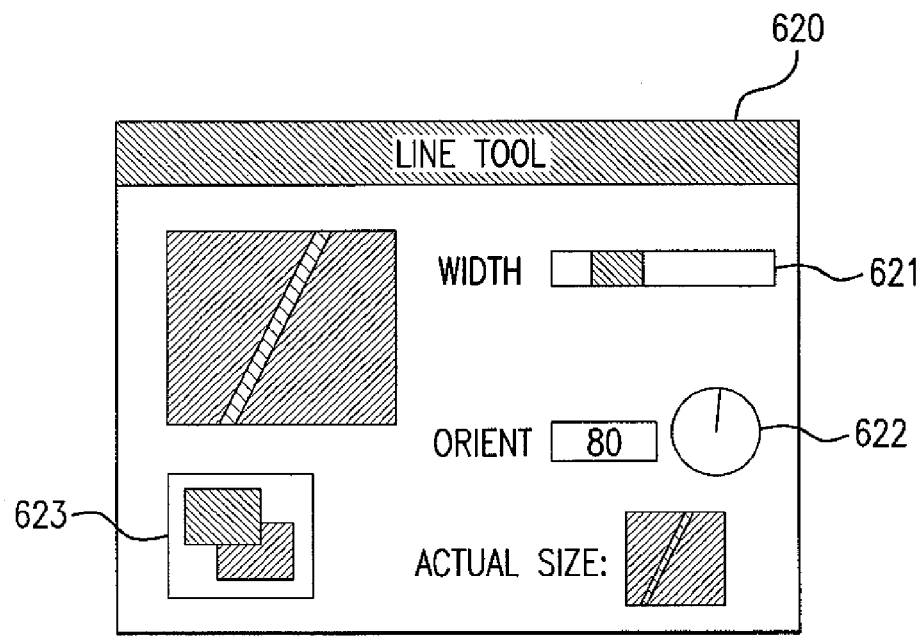
Figure 6C:
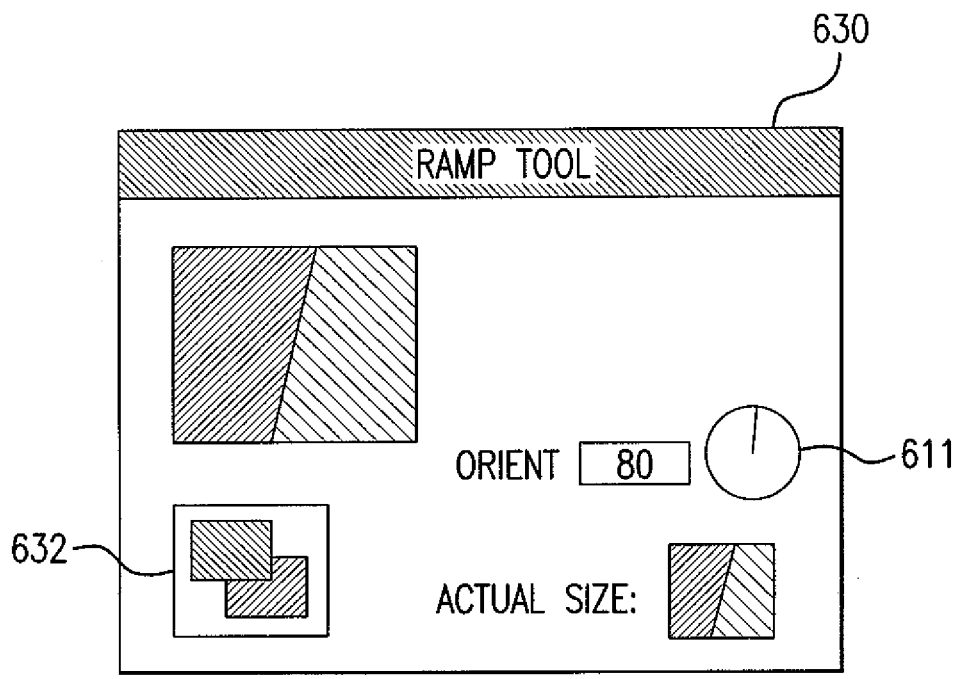
Figure 6D:
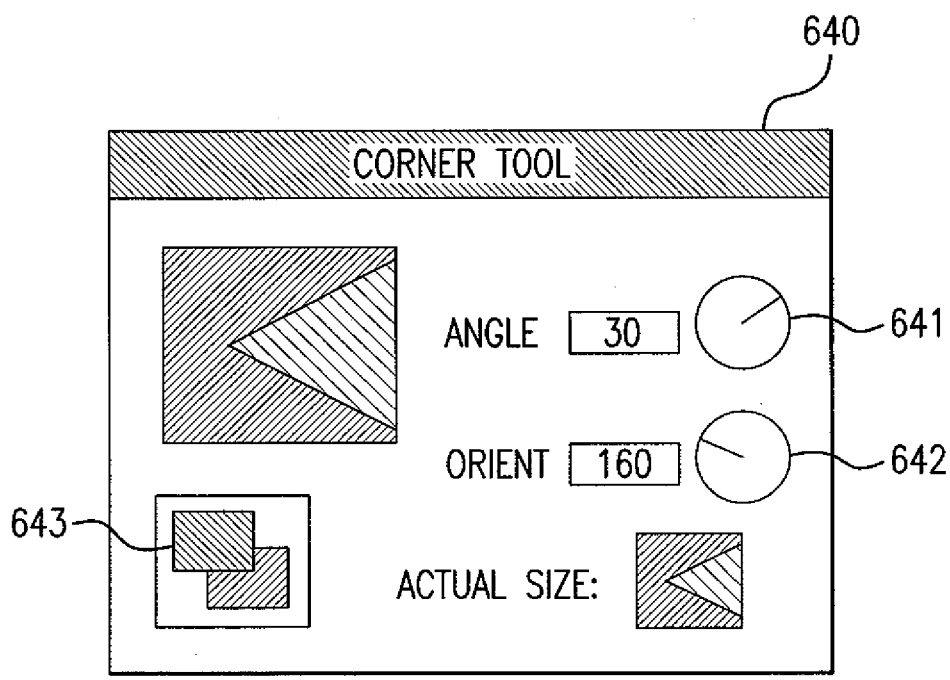

FIG. 5(b) shows the preferred details of the point spread function estimation step 530. Two-dimensional Spline interpolation is used to provide a continuous two-dimensional path 531. Voronoi Tessellation is then used to provide frame partitioning of the interpolated two-dimensional path 532. Equal area rectangles are constructed within each partitioned frame to determine the mean energy at each frame 533. Finally, the determined mean energy values are smoothed and normalized 534.

Referring next to FIGS. 6(*a*)-(*d*), exemplary tools that may be used to model a point spread function in accordance with an alternative embodiment of the present invention are shown. In some cases, a point spread function can be estimated directly from an image itself, without the need for additional motion information. For example, a small bright point light source on a dark background, such as dark night, which happen to be at the right depth, if the camera was translating, or if the point light source was at arbitrary depth (bright star in clear sky) and camera was rotating with no translation—then the image of this point light source provide point spread function which is good enough for de blurring, as long as the dynamic range of the camera is sufficient.

It is unlikely to expect such luck to happen, especially if the camera motion included translation about the optical axis, since at least two such points are needed. Instead, a set of primitives may be created that, if found in the image, can help estimating the point spread function. The greatest advantage of this approach is that it does not require any additions to the imaging process itself and it can be used for existing pictures as well. The disadvantage is that this method relies on user skills to estimate the real shape of an object from a blurred image—or from a different image that may not be blurred that was taken at a different time or different angle.

FIG. 6(*a*) illustrates an exemplary point tool 610 that may be used to define an object point. Since object points may not be perfect small white points over a black background, the tool provides means to define point size, eccentricity, orientation and color. Point size 611 is selected by a slider or by entering size in pixels of a fraction of a pixel. Point eccentricity 612 is selected by a slider or entered as a number as the ratio between main axes. Regarding orientation 613, if point eccentricity is not 1, then the orientation can be entered using a dial or as a number (angle). Point color 614 is selected using color tool, or sampled from the image itself and optionally modified. In addition, a background color may be selected using color tool, or sampled from the image itself and optionally modified.

FIG. 6(*b*) illustrates an exemplary line tool 620 that may be used to define an object line. The line attributes may include thickness, orientation, and color. Line thickness 621 is selected by a slider, or by entering thickness in pixels (can be fraction of a pixel). Line orientation 622 can is entered using a dial or as a number (angle). Line color 623 is selected using color tool—or sampled from the image itself and optionally modified. Again, a background color may be selected using color tool, or sampled from the image itself and optionally modified.

FIG. 6(*c*) illustrates an exemplary ramp tool 630 that may be used to define a ramp or edge. The attributes may include orientation and color. Ramp orientation 631 can is entered using a dial or as a number (angle). Ramp color 63 may be selected using color tool, or sampled from the image itself and optionally modified. A background color may be selected using color tool, or sampled from the image itself and optionally modified.

FIG. 6(*d*) illustrates an exemplary corner tool 640 that may be used to define an object corner. Corner attributes include angle, orientation, and color. The angle 641 may be entered using a dial or as a number (angle). Corner orientation 642 can is entered using a dial or as a number (angle). Corner color 643 may be selected using color tool, or sampled from the image itself and optionally modified. A background color may be selected using color tool, or sampled from the image itself and optionally modified.

For example, a user may download a motion-blurred image from the Internet, and desire to de-blur that image. Using the corner tool of FIG. 6(*d*), the user may examine a small region in the blurred image, e.g., 30×30 pixels, and create a model 30×30 pixel image of what that region should look-like when de-blurred. That model image, convolved by an unknown point spread function, will equal the original region of the blurred image.

One approach to finding this block is by using a Fourier transform. The Fourier transform of the model image region multiplied by the Fourier transform of the point spread function is equal to the Fourier transform of the captured image region. Therefore, the Fourier transform of the point spread function is determined by dividing the Fourier transform of the captured image region by the Fourier transform of the model image region, and an inverse Fourier transform may be used to obtain an estimated point spread function of the blurred image. Once obtained, the user may de-convolve the blurred image with the estimated point spread function to obtain an estimate of the captured imaged. The user then can then compare the estimated captured image with the original captured image, and visually determine whether the further refinements are necessary.

Figure 7:
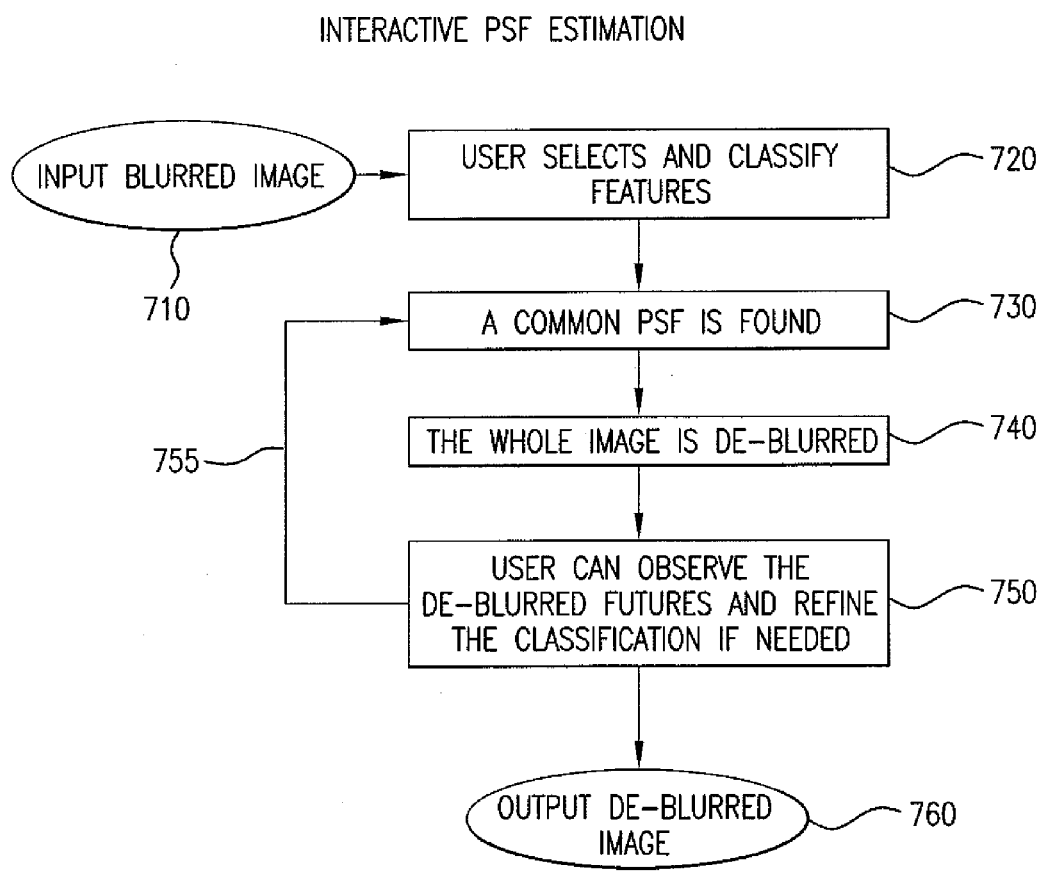
FIG. 7 is a flow diagram of a method for determining a point spread function in accordance with the embodiment of FIGS. 6(a)-(d)

Referring next to FIG. 7, a method for interactively estimating a point spread function using the tools of FIGS. 6(*a*)-(*d*) is shown. A user selects and classifies features within the blurred image 720, e.g., using the tools of FIGS. 6(*a*)-(*b*). A common point spread function is then determined using de-convolution, where the function is the unknown variable 730. The motion blurred image is de-blurred using the recovered point spread function 740, and the user is permitted to view the de-blurred image and refine his or her classifications as appropriate 750, 755. Finally, the de-blurred image is output 760.

Figure 8A:
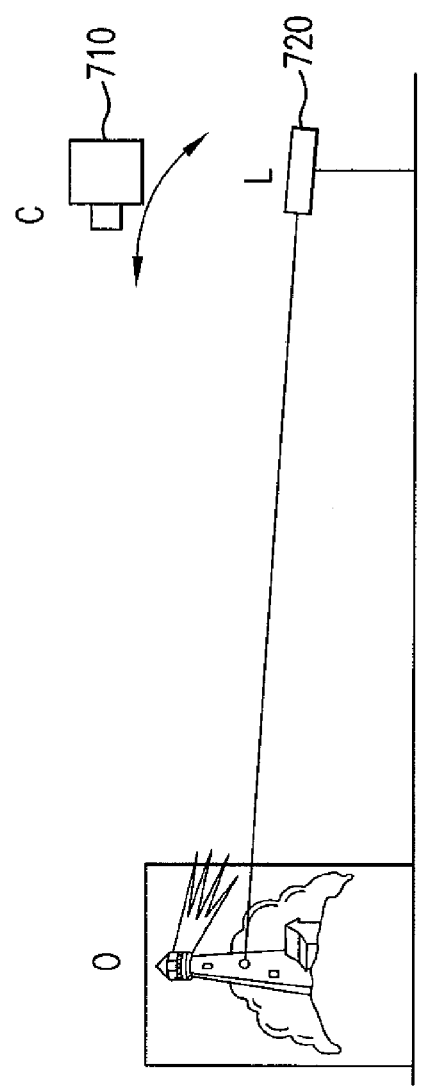
FIGS. 8 (a)-(b) are illustrative diagrams showing exemplary method for measuring a point spread function in accordance with another alternative embodiment of the present invention.
Figure 8B:
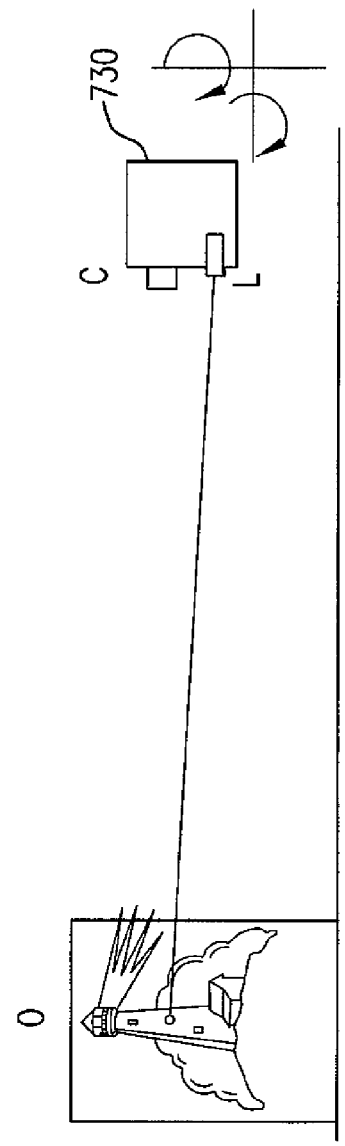

Referring next to FIGS. 8(*a*)-(*b*), an exemplary method for measuring a point spread function in accordance with another alternative embodiment of the present invention will be described. Laser guides are common in adaptive optics to provide a reference point for wavefront measurements. Similar techniques may be useful for motion de-blurring by projecting a reference point on the object using a laser beam as seen in FIG. 8(*a*). An alternative approach is to attach a (limited) stabilized laser to the camera itself as shown in FIG. 8(*b*).

As shown in FIGS. 8(*a*) and (*b*), a laser guide is attached to a camera. The laser is mounted on rings (gimbals), which are stabilized using gyroscopes. The laser emits one or more reference points to the scene. The image of these points is then utilized, after normalization to satisfy an energy constraint, to determine the point spread function that is sought. It should be noted that other light beam sources, such as columnated light beam sources, may be used in place of a laser.

It should be noted that the practical use of this embodiment is limited, as transmitting a laser beam into living objects may not be practical. However, the technique is useful for natural or commercial photography.

Figure 9:
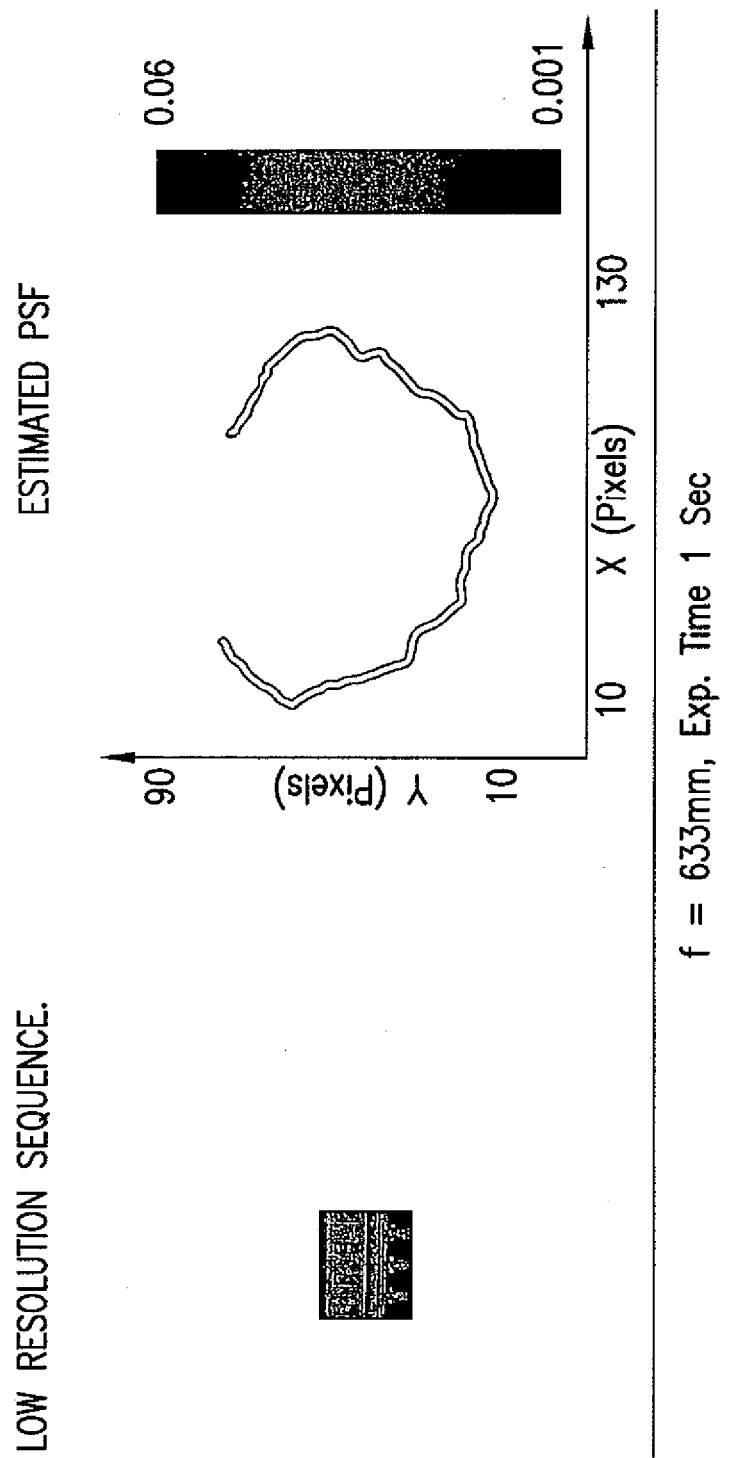
FIG. 9 is a graph of an exemplary estimated point spread function.
Figure 10A:
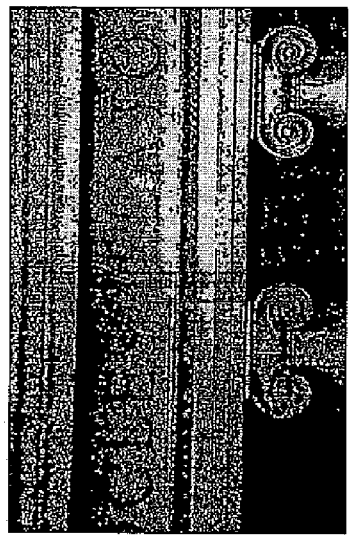
FIGS. 10(a)-(c) are exemplary images of a scene.
Figure 10C:
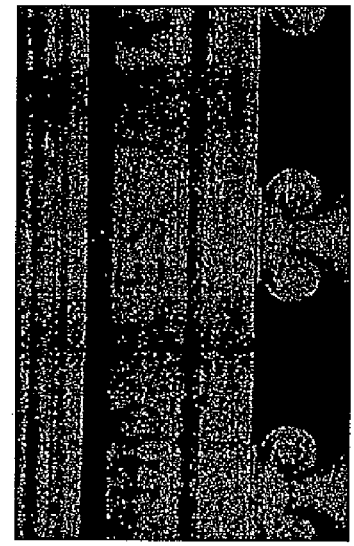
Figure 10B:
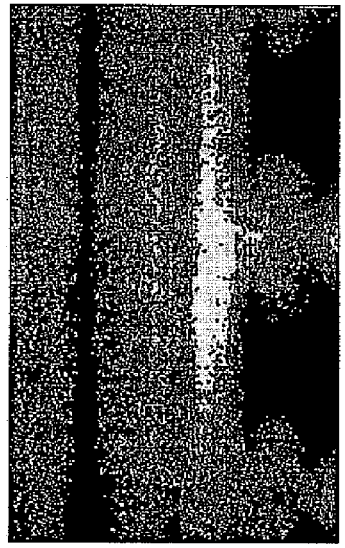

FIG. 9 is a graph of an exemplary estimated point spread function derived using the apparatus of FIG. 1(*a*) and the method described in connection with FIG. 8. FIGS. 10(*a*)-(*c*) are exemplary images of the corresponding scene, which FIG. 10(*a*) showing an image of the scene taken from a tripod-mounted camera, FIG. 10(*b*) showing the blurred image, and FIG. 10(*c*) showing the image after de-blurring. While the de-blurred image reveals some artifacts from the de-blurring process, it is a vast improvement over the blurred image.

Accordingly, techniques for correcting blurring introduced into an image due to camera motion have been provided.

The foregoing merely illustrates the principles of the invention. Various modifications and alterations to the described embodiments will be apparent to those skilled in the art in view of the teachings herein. For example, the foregoing techniques may be applied to video sequences taken by a moving camera, using an assumption of symmetrical distribution to recover the average motion vectors from the motion blurred images. It will thus be appreciated that those skilled in the art will be able to devise numerous systems and methods which, although not explicitly shown or described herein, embody the principles of the invention and are thus within the spirit and scope of the invention.

The invention claimed is:

1. A method for interactively determining a de-blurred image corresponding to a motion blurred image of a scene, comprising:
selecting one or more features within said motion blurred image with a graphical user interface drawing tool; forming one or more model images on selected one or more features with said graphical user interface drawing tool, each of which corresponds to one of said one or more selected features; estimating a point spread function using said selected one or more features and said corresponding one or more model images; and determining said de-blurred image using said estimated point spread function and said motion blurred image.

2. The method of claim 1, wherein at least one of said one of said one or more selected features comprises a point, and forming said one or more model images comprises using a point tool to form at least one of said one or more model images.

3. The method of claim 1, wherein at least one of said one of said one or more selected features comprises a line, and forming said one or more model images comprises using a line tool to form at least one of said one or more model images.

4. The method of claim 1, wherein at least one of said one of said one or more selected features comprises a ramp, and forming said one or more model images comprises using a ramp tool to form at least one of said one or more model images.

5. The method of claim 1, wherein at least one of said one of said one or more selected features comprises a corner, and forming said one or more model images comprises using a corner tool to form at least one of said one or more model images.

6. The method of claim 1, wherein selecting one or more features within said motion blurred image comprises selecting one or more points of an object in said scene.

7. The method of claim 1, wherein said point spread function is represented by a convolution kernel.

8. The method of claim 1, wherein determining said de-blurred image using said estimated point spread function and said motion blurred image comprises utilizing a Richardson Lucy algorithm.

9. A method for determining a de-blurred image corresponding to a motion blurred image of a scene comprising: selecting, using an image processor, one or more features within said motion blurred image including selecting one or more points of an object in said scene; estimating, using said image processor, a point spread function using said selected one or more features; and determining using said image processor, said de-blurred image using said estimated point spread function of a model image drawn on and corresponding to selected one or more features with a graphical user interface drawing tool and said motion blurred image.

10. The method of claim 9, wherein said point spread function is represented by a convolution kernel.

11. The method of claim 9, wherein determining said de-blurred image using said estimated point spread function and said motion blurred image comprises utilizing a Richardson Lucy algorithm.

* * * * *